United States Patent [19]
Saito et al.

[11] Patent Number: 4,791,078
[45] Date of Patent: Dec. 13, 1988

[54] CERAMIC COMPOSITION WITH IMPROVED ELECTRICAL AND MECHANICAL PROPERTIES

[75] Inventors: Susumu Saito; Masatomo Yonezawa; Kazuaki Utsumi, all of Tokyo, Japan

[73] Assignee: NEC Corporation, Tokyo, Japan

[21] Appl. No.: 89,456

[22] Filed: Aug. 26, 1987

[30] Foreign Application Priority Data

Aug. 26, 1986 [JP] Japan .................. 61-201051

[51] Int. Cl.$^4$ ............................ C04B 35/46
[52] U.S. Cl. ............................ 501/136; 501/135
[58] Field of Search .............. 501/134, 135, 136

[56] References Cited

U.S. PATENT DOCUMENTS

| | | | |
|---|---|---|---|
| 4,265,668 | 5/1981 | Fujiwara et al. | 501/134 |
| 4,399,544 | 7/1982 | Sakabe et al. | 501/134 |
| 4,574,255 | 3/1986 | Fujii et al. | 501/134 |
| 4,712,156 | 12/1987 | Bardham | 501/135 |

FOREIGN PATENT DOCUMENTS

| | | | |
|---|---|---|---|
| 54-146812 | 11/1979 | Japan | 501/134 |
| 54-147499 | 11/1979 | Japan | 501/134 |
| 60-33256 | 2/1985 | Japan | 501/134 |

*Primary Examiner*—Mark L. Bell
*Attorney, Agent, or Firm*—Sughrue, Mion, Zinn, Macpeak, and Seas

[57] ABSTRACT

A ceramic composition comprising a solid solution of the ternary system consisting essentially of lead magnesium-niobate (Pb(Mg$_{\frac{1}{3}}$Nb$_{\frac{2}{3}}$)O$_3$), lead nickel-niobate (Pb(Ni$_{\frac{1}{3}}$Nb$_{\frac{2}{3}}$)O$_3$) and lead titanate (PbTiO$_3$) as a major constituent, and an additional constituent consisting essentially of lead manganese-niobate (Pb(Mn$_{\frac{1}{3}}$Nb$_{\frac{2}{3}}$)O$_3$). The ternary system is expressed by the general formula [Pb(Mg$_{\frac{1}{3}}$Nb$_{\frac{2}{3}}$)O$_3$]$_x$−[Pb(Ni$_{\frac{1}{3}}$Nb$_{\frac{2}{3}}$)O$_3$]$_y$−[PbTiO$_3$]$_z$ wherein the subscripts x, y and z satisfy the equation $x+y+z=1$ and fall within the region defined by the line segments joining the seven points A, B, C, D, E, F and G within the triangular ternary-system diagram shown in the accompanying drawing. Preferably, the lead manganese-niobate (Pb(Mn$_{\frac{1}{3}}$Nb$_{\frac{2}{3}}$)O$_3$) is contained in a proportion of 0.01 mol % to 10 mol % to the major constituent.

2 Claims, 1 Drawing Sheet

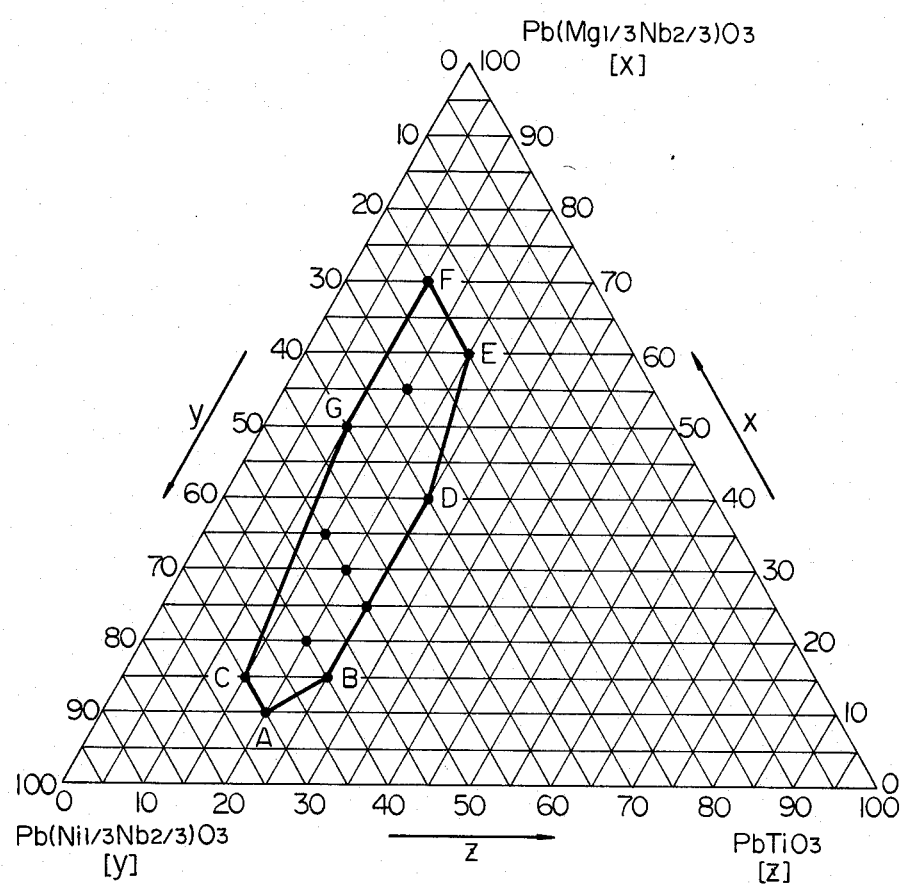

CERAMIC COMPOSITION WITH IMPROVED ELECTRICAL AND MECHANICAL PROPERTIES

FIELD OF THE INVENTION

The present invention relates to ceramic materials and, more particularly, to ceramic compositions having high dielectric constants. More particularly, the present invention is concerned with a ceramic composition which has a high dielectric constant and which exhibits not only a high insulation resistance at room and higher temperatures but also excellent mechanical properties. While such ceramic materials will find a wide variety of beneficial practical applications, a ceramic composition according to the present invention is useful particular as a dielectric material of a multilayer capacitor as will be appreciated as the description proceeds.

BACKGROUND OF THE INVENTION

Among the various ceramic materials having high dielectric constants, barium titanate ($BaTiO_3$) and a solid solution of, typically, barium titanate ($BaTiO_3$), calcium titanate ($CaTiO_3$) and lead titanate ($PbTiO_3$) in particular have conventionally been used for practical purposes, as well known in the art. These known dielectric ceramic materials are however not fully acceptable for their dielectric constants which are of the order of as low as 8000 or even less. Increasing the dielectric constants of any of such known ceramic materials at an ambient temperature will contribute to improvement in some electrical characteristics of, for example, a capacitor using the material. However, such an attempt would results in objectionable broadening of the range over which the dielectric constant of the material is variable with temperature. If, then, one attempts to restrict the range of variation of the dielectric constant with temperature, there would result reduction in the maximum value of the dielectric constant.

On the other hand, it is also known that ceramic materials for ordinary use are required to have low dielectric loses and high insulating resistances. As to the latter, it is desirable that ceramic materials for use in ceramic capacitors have high insulating resistances not only at room temperature but also at the highest temperatures at which the capacitors may be required to operate. This is also required by the standard (MIL-C-555681B) established by the Military Specification of the U.S. Department of Defense.

As noted at the outset of the description, a ceramic composition with a high dielectric constant is useful particular as a dielectric material of a multilayer ceramic capacitor. Such a multilayer ceramic capacitor may be fabricated on a semiconductor substrate to form a chip capacitor. In a chip capacitor of this nature, there may be a difference in thermal expansion coefficient present between the semiconductor substrate and the bulk ceramic forming part of the capacitor structure. Such a difference in thermal expansion coefficient may create a mechanical strain in the capacitor structure so that cracks and even serious damages resulting from the cracks may be produced in the capacitor structure due to the mechanical strains. On the other hand, a ceramic composition with a high dielectric constant may be used to form part of a dip (dual in-line package) capacitor which is typically packaged in an epoxy resin. In the case of a capacitor of this type, a similar problem may arise due to the cracks created in the capacitor structure due to the stress imparted to the structure from the packaging material.

In any event, the lower the mechanical strengths of the ceramic materials forming part of capacitor structures, the more frequently will cracks and damages resulting therefrom be created in the capacitor structures and accordingly the lower the reliability of performance of the capacitor will become. Increasing the mechanical strength of a ceramic material is, thus, one of the major practical requirements of the material especially where the material is intended for use in a chip of dip-type capacitor.

It is accordingly an important object of the present invention to provide an improved ceramic composition having a high dielectric constant and a low dielectric loss.

It is another important object of the present invention to provide an improved ceramic composition having a high insulation resistance at room and higher temperatures in addition to the high dielectric constant and low dielectric loss.

It is still another important object of the present invention to provide an improved ceramic composition which not only has a high dielectric constant and a low dielectric loss but exhibits a high insulation resistance at room and higher temperatures and excellent mechanical properties.

Yet, it is still another important object of the present invention to provide an improved ceramic capacitor which features enhanced performance reliability for its increased resistance to cracks and damages.

SUMMARY OF THE INVENTION

In accordance with the present invention, there is provided a ceramic composition which comprises a solid solution of the ternary system consisting essentially of lead magnesium-niobate ($Pb(Mg_{\frac{1}{3}}Nb_{\frac{2}{3}})O_3$), lead nickel-niobate ($Pb(Ni_{\frac{1}{3}}Nb_{\frac{2}{3}})O_3$) and lead titanate ($PbTiO_3$) as a major constituent, and an additional constituent consisting essentially of led manganese-niobate ($Pb(Mn_{\frac{1}{3}}Nb_{\frac{2}{3}})O_3$), the ternary system being expressed by the general empirical formula $[Pb(Mg_{\frac{1}{3}}Nb_{\frac{2}{3}})O_3]_x - [Pb(Ni_{\frac{1}{3}}Nb_{\frac{2}{3}})O_3]_y - [PbTiO_3]_z$ wherein the subscripts x, y and z satisfy the equation $x+y+z=1$ and fall within the region defined by the line segments joining the seven points, A, B, C, D, E, F and G which are given by the coordinates A ($x=0.10$, $y=0.70$, $z=0.20$),
B ($x=0.15$, $y=0.60$, $z=0.25$),
C ($x=0.15$, $y=0.70$, $z=0.15$),
D ($x=0.40$, $y=0.35$, $z=0.25$),
E ($x=0.60$, $y=0.20$, $z=0.20$),
F ($x=0.70$, $y=0.20$, $z=0.10$), and
G ($x=0.50$, $y=0.40$, $z=0.10$), on the triangular ternary-system diagram shown in the accompanying drawing. Preferably, the lead manganese-niobate ($Pb(Mn_{\frac{1}{3}}Nb_{\frac{2}{3}})O_3$) is contained in a proportion of 0.01 mol% to 10 mol% to the major constituent.

These seven points A to G within the ternary-system diagram shown in the accompanying drawing have been selected in accordance with the present invention so that the following general conditions may be fulfilled:

(1) the subscripts x, y and y in the formula satisfy the following relationships:
$0.10 \leq x \leq 0.70$,
$0.20 \leq y \leq 0.70$, $0.10 \leq z \leq 0.25$, (2) the ceramic compositions falling within the heptagonal region have as high dielectric constants ($\epsilon$) and as low dielectric losses (tan $\delta$) as well as as high insulation resistances ($\rho$) at room and higher temperatures and excellent mechanical strengths as represented by flexural strengths ($\tau$) as possible.

(3) the dielectric constants ($\epsilon$) of the compositions as as small temperature dependences ($\Delta\epsilon/\epsilon$) as possible.

Thus, ceramic compositions containing major constituents outside the heptagonal region defined by the seven points A to G within the ternary-system diagram shown in the accompanying drawing are not acceptable in accordance with the present invention because of their low dielectric constants ($\epsilon$), high dielectric losses (tan $\delta$), low insulation resistances ($\rho$) at room and higher temperatures, small flexural strengths ($\tau$) and/or high temperature dependences ($\Delta\epsilon/\epsilon$).

An improved ceramic composition according the present invention is used to form part of a multilayer ceramic capacitor, there will be achieved enhanced performance reliability for its increased mechanical strength resistive formation of to cracks and damages.

BRIEF DESCRIPTION OF THE DRAWING

The advantages of a ceramic composition according to the present invention will be more clearly appreciated from the following description taken in conjunction with the accompanying drawing.

DESCRIPTION OF THE PREFERRED EMBODIMENT

As stated above, a ceramic composition according to the present invention comprises as a major constituent a solid solution of the ternary system consisting essentially of lead magnesium-niobate ($Pb(Mg_{\frac{1}{3}}Nb_{\frac{2}{3}})O_3$), lead nickel-niobate ($Pb(Ni_{\frac{1}{3}}Nb_{\frac{2}{3}})O_3$) and lead titanate ($PbTiO_3$) as a major constituent. This particular ternary system per se is disclosed in U.S. Pat. No. 3,594,321 and features a high dielectric constant and a low dielectric loss as therein discussed.

In accordance with the present invention, such a known ternary system is expressed by the general empirical formula $[Pb(Mg_{\frac{1}{3}}Nb_{\frac{2}{3}})O_3]_x-[Pb(Ni_{\frac{1}{3}}Nb_{\frac{2}{3}})O_3]_y-[PbTiO_3]_z$ wherein the subscripts x, y and z satisfy the equation $x+y+z=1$ and fall within the region defined by the line segments joining the seven points A, B, C, D, E, F and G within the triangular ternary-system diagram shown in the drawing. As will be seen from the drawings, these seven points A, B, C, D, E, F and G are given by the coordinates A ($x=0.10$, $y=0.70$, $z=0.20$),
B ($x=0.15$, $y=0.60$, $z=0.25$),
C ($x=0.15$, $z=0.70$, $z=0.15$),
D ($x=0.40$, $y=0.35$, $z=0.25$),
E ($x=0.60$, $y=0.20$, $z=0.20$),
F ($x=0.70$, $y=0.20$, $z=0.10$), and
G ($x=0.50$, $y=0.40$, $z=0.10$), on the triangular ternary-system diagram shown in the drawing.

In accordance with another outstanding aspect of the present invention, the ceramic composition further comprises an additional constituent consisting essentially of lead manganese-niobate ($Pb(Mn_{\frac{1}{3}}Nb_{\frac{2}{3}})O_3$). The addition of such an additional constituent to the ternary system $[Pb(Mg_{\frac{1}{3}}Nb_{\frac{2}{3}})O_3]_x-[Pb(Ni_{\frac{1}{3}}Nb_{\frac{2}{3}})O_3]_y-[PbTiO_3]_z$ significantly contributes to improving the mechanical strength and the specific resistivity at high temperature. Thus, a ceramic composition according to the present invention has a high insulation resistance at room and higher temperatures and excellent mechanical properties in addition to the high dielectric constant and low dielectric loss. A multilayer ceramic capacitor fabricated with such a ceramic composition will features improved reliability of performance for its increased resistance to cracks and damages which would otherwise be created in the capacitor structure. For the reason to be clarified, the lead manganese-niobate ($Pb(Mn_{\frac{1}{3}}Nb_{\frac{2}{3}})O_3$) used as the additional constituent of a ceramic composition according to the present invention is contained in the composition preferably in a proportion of 0.01 mol% to 10 mol% to the major constituent.

The features and advantages of a ceramic composition according to the present invention will be better understood from the following Example of preparing such a ceramic composition.

EXAMPLE

Used as the starting materials for the preparation of sample ceramics were lead oxide (PbO), magnesium oxide (MgO), niobium oxide ($Nb_2O_5$), nickel oxide (NiO), titanium oxide ($TiO_2$), and manganese carbonate ($MnCO_3$), each in powder form and having a purity of 99.9%. These starting materials were individually weighed to yield the different proportions of the respective ingredients of the major and additional constituents of the representative specimens Nos. 1 to 33 shown in the following Table annexed hereto. Among the various samples tabulated therein, each of the samples shown with an asterisk (*) affixed to the sample number is devoid of the additional constituent ($Pb(Mn_{\frac{1}{3}}Nb_{\frac{2}{3}})O_3$) and thus falls outside the purview of the present invention.

The fractions of the starting materials thus weighed to provide each of the sample compositions shown in the Table were then mixed together with addition of distilled water within a ball mill and the resultant mixtures were dried and presintered at temperatures ranging from about 750° C. to about 800° C. The presintered materials were crushed into fragments, which were then pulverized, filtered and dried and, thereafter, the resultant powders were, after addition of an organic binder followed by grain dressing, pressed into solid discs each measuring 16 mm in diameter and about 2 mm in thickness and cylinders each measuring 16 mm in diameter and about 10 mm in length. The discs and cylinders thus prepared included four discs and one cylinder for each of the sample compositions indicated in the Table. The samples in the form of discs were to be used for the determination of the electrical properties of the materials as represented by the dielectric constants ($\epsilon$), dielectric loses (tan $\delta$) and specific resistivities ($\rho$) of the samples. The samples in the form of cylinders were to be used for the evaluation of the mechanical properties of the ceramic compositions.

The sample discs and cylinders thus prepared were sintered for an hour at temperatures ranging from about 100° C. to about 1080° C. in the ambient air. Silver electrodes were applied by firing onto the opposite faces of each of the sintered discs. Tests were then conducted with these sample discs to measure the capacitance and the dielectric loss (tan $\delta$) of each disc at a frequency of 1 KHz, with a voltage of 1 volts in root mean square value (r.m.s.) and at a temperature of 20° C. From the capacitance and dielectric loss (tan $\delta$) thus measured for each sample disc was calculated the dielectric constant (ε) of the disc material. The dielectric constants and dielectric loses determined in the manner for the individual sample discs are shown in the Table. Tests were further conducted to measure the insulating resistances of the sample discs with use of a super-insulating resistance tester with a voltage of 50 volts applied for a minute to each of the sample discs, first at a temperature of 20° C. and then at a temperature of 125° C. The temperature of 20° C. was selected as being representative of room temperature and the temperature of 125° C. as being representative of the highest temperatures at which capacitors using the ceramic compositions under consideration may be required to operate as set forth in the U.S. Military Specification MIL-C-555681B. The results of these tests are also demonstrated in the Table.

The mechanical properties of the ceramic compositions prepared were evaluated in terms of the flexural strength of each of the compositions. For this purpose, each of the sample cylinders was sliced to obtain ten rectangular slices measuring 2 mm in width and about 13 major in length. Each of the sample slices thus prepared was then lapped to a thickness of 0.5 mm. A well-known transverse testing method was used to measure the breaking load Pm in kilograms with the fulcrum-to-fulcrum distance taken at 9 mm for each of the sample slices. From the breaking load Pm measures in this fashion was calculated the flexural strength ($\tau$) in kg/cm$^2$ for each sample disc in accordance with the formula $\tau = 3/2(Pm \cdot d/Wt^2)$ wherein d is the fulcrum-to-fulcrum distance and t and W are the thickness (=9 mm) and width (=2 mm), respectively, of the slice.

In the Table herein presented are indicated the electrical properties represented by the dielectric constant (δ), dielectric loses (tan δ) and specific resistivities (ρ) at 20° C. and 125° C. of the sample discs tested. In the Table are further shown the mechanical properties represented by the flexural strengths ($\tau$) of the sample slices determined as above. The electrical properties have been figured out as the arithmetic means of the values respectively determined of four of the sample discs for each of the representative specimens Nos. 1 to 33, while the mechanical properties have been calculated as the arithmetic means of the values respectively determined of ten of the sample slices for each of the representative specimens tabulated.

As will be seen from the Table, the ceramic compositions each comprising the major constituent consisting essentially of the ternary system $[Pb(Mg_{\frac{1}{3}}Nb_{\frac{2}{3}})O_3]_x - [Pb(Ni_{\frac{1}{3}}Nb_{\frac{2}{3}})O_3]_y - [PbTiO_3]_z$ and the additional constituent consisting essentially of lead manganese-niobate $(Pb(Mn_{\frac{1}{3}}Nb_{\frac{2}{3}})O_3)$ are such that each of the compositions has not only a high dielectric constant and a low dielectric loss but exhibits a high insulation resistance at room and higher temperatures and excellent mechanical strength as compared with the ceramic compositions devoid of lead manganese-niobate $(Pb(Mn_{\frac{1}{3}}Nb_{\frac{2}{3}})O_3)$. Where such an improved ceramic composition according the present invention is used to form part of a multilayer ceramic capacitor, there will be achieved enhanced performance reliability for its increased mechanical strength resistive formation of to cracks and damages.

As will be further seen from the Table, a ceramic composition containing an additive of lead manganese-niobate $(Pb(Mn_{\frac{1}{3}}Nb_{\frac{2}{3}})O_3)$ in a proportion of less than 0.01 mol% to the major constituent exhibits a relatively limited degree of improvement in the flexural strength ($\tau$). When the proportion of the additional constituent is higher than 10 mol% to the major constituent, then the flexural strength ($\tau$) of the composition becomes rather insufficient though higher than those achievable of the compositions devoid of lead manganese-niobate $(Pb(Mn_{\frac{1}{3}}Nb_{\frac{2}{3}})O_3)$. For these reasons it will be understood that the lead manganese-niobate $(Pb(Mn_{\frac{1}{3}}Nb_{\frac{2}{3}})O_3)$ used as the additional constituent of a ceramic composition according to the present invention is contained in the composition preferably in a proportion of 0.01 mol% to 10 mol% to the ternary system $[Pb(Mg_{\frac{1}{3}}Nb_{\frac{2}{3}})O_3]_x - [Pb(Ni_{\frac{1}{3}}Nb_{\frac{2}{3}})O_3]_y - [PbTiO_3]_z$. It may also be noted that any ceramic composition containing the ternary system $[Pb(Mg_{\frac{1}{3}}Nb_{\frac{2}{3}})O_3]_x - [Pb(Ni_{\frac{1}{3}}Nb_{\frac{2}{3}})O_3]_y - [PbTiO_3]_z$ falling outside the region defined by the line segments A-B-C-D-E-F-G shown in the drawing has too low a dielectric constant to be operable for practical purposes and requires the use of an unwantedly high temperature during sintering process.

It will be seen from the Table shown that the seven apices A to G of the heptagonal region defined in accordance with the present invention within the triangular ternary-system diagram shown in the drawing are given, from among the specimens Nos. 1 to 42, as follows:

| Apex | Specimen No. | Coordinates (10x, 10y, 10z) |
| --- | --- | --- |
| A | 37 | (10, 70, 20) |
| B | 1 | (15, 60, 25) |
| C | 39 | (15, 70, 15) |
| D | 16 | (40, 35, 25) |
| E | 35 | (60, 20, 20) |
| F | 21 | (70, 20, 10) |
| G | 22 | (50, 40, 10) |

It may be added in connection with the compositions shown in the Table that each of the specimens Nos. 40 and 41 in particular has a Curie point higher than 130° C. and has a dielectric constant (ε) which tends to increase with temperature, exhibiting a temperature dependency (Δε/ε) of as high as +22% at 85° C. A temperature dependency of this order of a ceramic capacitor is not only objectionable from practical point of view but fails to meet the local standards for ceramic capacitors.

By addition of lead manganese-niobate $Pb(Mn_{\frac{1}{3}}Nb_{\frac{2}{3}})O_3$ to a ceramic composition outside the region particularly defined within the triangular ternary-system diagram shown in the drawing, improvements might also be achieved slightly in the dielectric loss and specific resistivities at room and higher temperatures and more slightly in the temperature dependency of the dielectric constant of the ceramic composition. Such a ceramic composition however has an objectionably low dielectric constant (ε) and requires an objectionably high sintering temperature during facrication process and is for this reason not acceptable for use as a capacitor. This means that addition of the lead manganese-niobate $Pb(Mn_{\frac{1}{3}}Nb_{\frac{2}{3}})O_3$ to a ceramic composition outside the region defined within the shown ternary-system diagram is not only of no practical significance but does not contribute to improving the temperature dependency of the dielectric constant (ε) to such an extant as to be acceptable under local standards.

TABLE

| No. | Major Constituent (mol %) x | y | z | Additional Constituent (mol %) | Dielectric Constant ε | Dielectric Loss tan δ (%) | Specific Resistivity at 20° C. (ohm-cm) | Specific Resistivity at 125° C. (ohm-cm) | Flexural Strength (kg/cm$^2$) |
|---|---|---|---|---|---|---|---|---|---|
| 1* | 15 | 60 | 25 | — | 13150 | 4.2 | $8.9 \times 10^{11}$ | $7.1 \times 10^9$ | 750 |
| 2* | 25 | 50 | 25 | — | 15240 | 5.1 | $6.3 \times 10^{11}$ | $3.1 \times 10^9$ | 720 |
| 3 | 25 | 50 | 25 | 0.5 | 15200 | 5.1 | $8.0 \times 10^{11}$ | $9.2 \times 10^9$ | 850 |
| 4 | 25 | 50 | 25 | 1.0 | 15440 | 4.5 | $1.1 \times 10^{12}$ | $1.8 \times 10^{11}$ | 910 |
| 5 | 25 | 50 | 25 | 2.0 | 16170 | 3.0 | $1.4 \times 10^{12}$ | $3.3 \times 10^{11}$ | 1150 |
| 6 | 25 | 50 | 25 | 4.0 | 16010 | 2.8 | $2.5 \times 10^{12}$ | $3.4 \times 10^{11}$ | 1070 |
| 7 | 25 | 50 | 25 | 6.0 | 14640 | 1.5 | $4.0 \times 10^{12}$ | $3.0 \times 10^{11}$ | 950 |
| 8 | 25 | 50 | 25 | 10.0 | 9820 | 1.8 | $1.9 \times 10^{12}$ | $1.8 \times 10^{11}$ | 900 |
| 9* | 20 | 60 | 20 | — | 21000 | 0.6 | $7.5 \times 10^{10}$ | $5.0 \times 10^9$ | 810 |
| 10 | 20 | 60 | 20 | 0.01 | 21010 | 0.6 | $7.4 \times 10^{10}$ | $5.1 \times 10^9$ | 880 |
| 11 | 20 | 60 | 20 | 0.05 | 21000 | 0.6 | $7.5 \times 10^{10}$ | $5.2 \times 10^9$ | 900 |
| 12 | 20 | 60 | 20 | 0.1 | 20500 | 0.5 | $1.2 \times 10^{11}$ | $5.1 \times 10^9$ | 930 |
| 13 | 20 | 60 | 20 | 0.5 | 18800 | 0.4 | $3.2 \times 10^{11}$ | $9.2 \times 10^{10}$ | 950 |
| 14 | 20 | 60 | 20 | 1.0 | 15500 | 0.3 | $9.0 \times 10^{11}$ | $7.4 \times 10^{11}$ | 1010 |
| 15 | 20 | 60 | 20 | 2.0 | 11400 | 0.3 | $1.6 \times 10^{12}$ | $6.8 \times 10^{12}$ | 1350 |
| 16* | 40 | 35 | 25 | — | 8350 | 3.8 | $7.8 \times 10^{11}$ | $5.4 \times 10^9$ | 840 |
| 17* | 30 | 50 | 20 | — | 16700 | 2.8 | $4.2 \times 10^{12}$ | $1.1 \times 10^{10}$ | 790 |
| 18 | 30.15 | 49.75 | 20.1 | 0.5 | 13750 | 2.1 | $2.75 \times 10^{12}$ | $3.4 \times 10^{11}$ | 940 |
| 19 | 30.3 | 49.5 | 20.2 | 1.0 | 11240 | 1.4 | $1.9 \times 10^{12}$ | $2.3 \times 10^{11}$ | 960 |
| 20 | 30.6 | 49.0 | 20.4 | 2.0 | 9300 | 0.7 | $1.6 \times 10^{12}$ | $1.8 \times 10^{11}$ | 1020 |
| 21* | 70 | 20 | 10 | — | 6120 | 1.4 | $4.0 \times 10^{11}$ | $8.2 \times 10^9$ | 860 |
| 22* | 50 | 40 | 10 | — | 9070 | 0.2 | $5.1 \times 10^{12}$ | $2.1 \times 10^{10}$ | 880 |
| 23* | 55 | 30 | 15 | — | 12010 | 3.7 | $2.3 \times 10^{12}$ | $1.2 \times 10^{10}$ | 810 |
| 24 | 55 | 30 | 15 | 0.01 | 12000 | 3.5 | $2.5 \times 10^{12}$ | $1.5 \times 10^{10}$ | 910 |
| 25 | 55 | 30 | 15 | 0.05 | 11100 | 3.0 | $2.5 \times 10^{12}$ | $2.3 \times 10^{10}$ | 950 |
| 26 | 55 | 30 | 15 | 0.1 | 11050 | 2.5 | $2.7 \times 10^{12}$ | $3.8 \times 10^{10}$ | 990 |
| 27 | 55 | 30 | 15 | 0.5 | 9990 | 1.8 | $2.7 \times 10^{12}$ | $5.1 \times 10^{10}$ | 1020 |
| 28 | 55 | 30 | 15 | 1.0 | 9380 | 0.7 | $1.8 \times 10^{12}$ | $9.7 \times 10^{10}$ | 1100 |
| 29 | 55 | 30 | 15 | 2.0 | 7370 | 0.7 | $1.3 \times 10^{12}$ | $1.1 \times 10^{11}$ | 1250 |
| 30* | 35 | 50 | 15 | — | 11450 | 0.3 | $1.0 \times 10^{13}$ | $2.4 \times 10^{11}$ | 870 |
| 31 | 35 | 50 | 15 | 0.5 | 9900 | 0.3 | $9.9 \times 10^{12}$ | $2.9 \times 10^{11}$ | 1100 |
| 32* | 40 | 40 | 20 | — | 14190 | 4.7 | $1.9 \times 10^{12}$ | $1.1 \times 10^{10}$ | 850 |
| 33 | 40 | 40 | 20 | 0.5 | 12000 | 1.3 | $1.8 \times 10^{12}$ | $1.7 \times 10^{10}$ | 1050 |
| 34* | 60 | 20 | 20 | — | 23500 | 2.3 | $6.9 \times 10^{11}$ | $7.3 \times 10^9$ | 890 |
| 35 | 60 | 20 | 20 | 0.1 | 22000 | 1.8 | $7.2 \times 10^{11}$ | $8.2 \times 10^{10}$ | 930 |
| 36* | 10 | 70 | 20 | — | 11500 | 1.1 | $4.2 \times 10^{11}$ | $1.3 \times 10^9$ | 870 |
| 37 | 10 | 70 | 20 | 0.1 | 10900 | 0.7 | $4.0 \times 10^{11}$ | $9.9 \times 10^9$ | 950 |
| 38* | 15 | 70 | 15 | — | 11000 | 0.9 | $8.1 \times 10^{11}$ | $1.1 \times 10^9$ | 910 |
| 39 | 15 | 70 | 15 | 0.1 | 9980 | 0.6 | $1.0 \times 10^{12}$ | $8.5 \times 10^{10}$ | 970 |
| 40* | 15 | 45 | 40 | — | 3540 | 2.3 | $3.1 \times 10^{11}$ | $2.0 \times 10^9$ | 950 |
| 41* | 20 | 40 | 40 | — | 3290 | 2.2 | $1.3 \times 10^{11}$ | $4.4 \times 10^{10}$ | 990 |
| 42* | 20 | 40 | 40 | 0.1 | 2880 | 1.9 | $1.1 \times 10^{11}$ | $6.1 \times 10^{10}$ | 980 |

Note: The asterisk (*) shows the samples falling outside the purview of the invention.

What is claimed is:

1. A ceramic composition consisting essentially of a solid solution of (a) the ternary system consisting essentially of lead magnesium-niobate (Pb(Mg$_\frac{1}{3}$Nb$_\frac{2}{3}$)O$_3$), lead nickel-niobate (Pb(Ni$_\frac{1}{3}$Nb$_\frac{2}{3}$)O$_3$) and lead titanate (PbTiO$_3$) as a major constituent, and (b) an additional constituent consisting essentially of lead manganese-niobate (Pb(Mn$_\frac{1}{3}$Nb$_\frac{2}{3}$)O$_3$) in a proportion of about 0.01 to about 10 mol% to said major constituent, said ternary system being expressed by the general empirical formula [Pb(Mg$_\frac{1}{3}$Nb$_\frac{2}{3}$)O$_3$]$_x$−[Pb(Ni$_\frac{1}{3}$Nb$_\frac{2}{3}$)O$_3$]$_y$−[PbTiO$_3$]$_z$ wherein the subscripts x, y and z satisfy the equation $x+y+z=1$ and fall within the region defined by the line segments joining the seven points C, A, B, D, E, F and G which are given by the coordinates A (x=0.10, y=0.70, z=0.20),
B (x=0.15, y=0.60, z=0.25),
C (x=0.15, y=0.70, z=0.15),
D (x=0.40, y=0.35, z=0.25),
E (x=0.60, y=0.20, z=0.20),
F (x=0.70, y=0.20, z=0.10), and
G (x=0.50, y=0.40, z=0.10), on the triangular ternary-system diagram shown in the accompanying drawing.

2. A ceramic composition consisting essentially of (a) lead magnesium-niobate (Pb(Mg$_\frac{1}{3}$Nb$_\frac{2}{3}$)O$_3$), lead nickel-niobate (Pb(Ni$_\frac{1}{3}$Nb$_\frac{2}{3}$)O$_3$) and lead titanate (PbTiO$_3$) as a major constituent, and (b) an additional constituent consisting essentially of lead manganese-niobate (Pb(Mn$_\frac{1}{3}$Nb$_\frac{2}{3}$)O$_3$) contained in a proportion of 0.01 mol% to 10 mol% to said major constituent, the composition of said major constituent being expressed by the general empirical formula [Pb(Mg$_\frac{1}{3}$Nb$_\frac{2}{3}$)O$_3$]$_x$−[Pb(Ni$_\frac{1}{3}$Nb$_\frac{2}{3}$)O$_3$]$_y$−[PbTiO$_3$]$_z$ wherein the subscripts x, y and z satisfy the equation $x+y+z=1$ and fall within the region defined by the line segments joining the five points C, A, B, D and G which are given by the coordinates A (x=0.10, y=0.70, z=0.20),
B (x=0.15, y=0.60, z=0.25),
C (x=0.15, y=0.70, z=0.15),
D (x=0.40, y=0.35, z=0.25), and
G (x=0.50, y=0.40, z=0.10), on the triangular ternary-system diagram shown in the accompanying drawing.

* * * * *

UNITED STATES PATENT AND TRADEMARK OFFICE
CERTIFICATE OF CORRECTION

PATENT NO. : 4,791,078
DATED : December 13, 1988
INVENTOR(S) : SAITO ET AL

It is certified that error appears in the above-identified patent and that said Letters Patent is hereby corrected as shown below:

ABSTRACT, LINE 3,         Delete "$Pb(Mg_{1/3}Nb\ hd\ 2/3)O_3$" and insert --$Pb(Mg_{1/3}Nb_{2/3})O_3$--

COLUMN 2, LINE 65         Delete "x, y and y" and insert --x, y and z--

COLUMN 5, LINE 36         Delete "($\delta$)," and insert --($\varepsilon$),--

COLUMN 5, LINE 50         Delete "$[Pb(Mg_{1/3}Nb_{17}0$" and insert --$[Pb(Mg_{1/3}Nb_{2/3}$--

COLUMN 6, LINE 13         Delete "$[Pb(Mg_{1/3}Nb_{17}0$" and insert --$[Pb(Mg_{1/3}Nb_{2/3}$--

UNITED STATES PATENT AND TRADEMARK OFFICE
CERTIFICATE OF CORRECTION

PATENT NO. : 4,791,078

DATED : December 13, 1988

INVENTOR(S) : SAITO ET AL

It is certified that error appears in the above-identified patent and that said Letters Patent is hereby corrected as shown below:

COLUMN 6, LINE 59          Delete "facrication" and insert --fabrication--.

Signed and Sealed this

Third Day of October, 1989

Attest:

DONALD J. QUIGG

*Attesting Officer*     *Commissioner of Patents and Trademarks*